July 21, 1925.
C. R. VICKERS
TOOL HOLDER
Filed Jan. 19, 1923
1,547,087
2 Sheets-Sheet 1
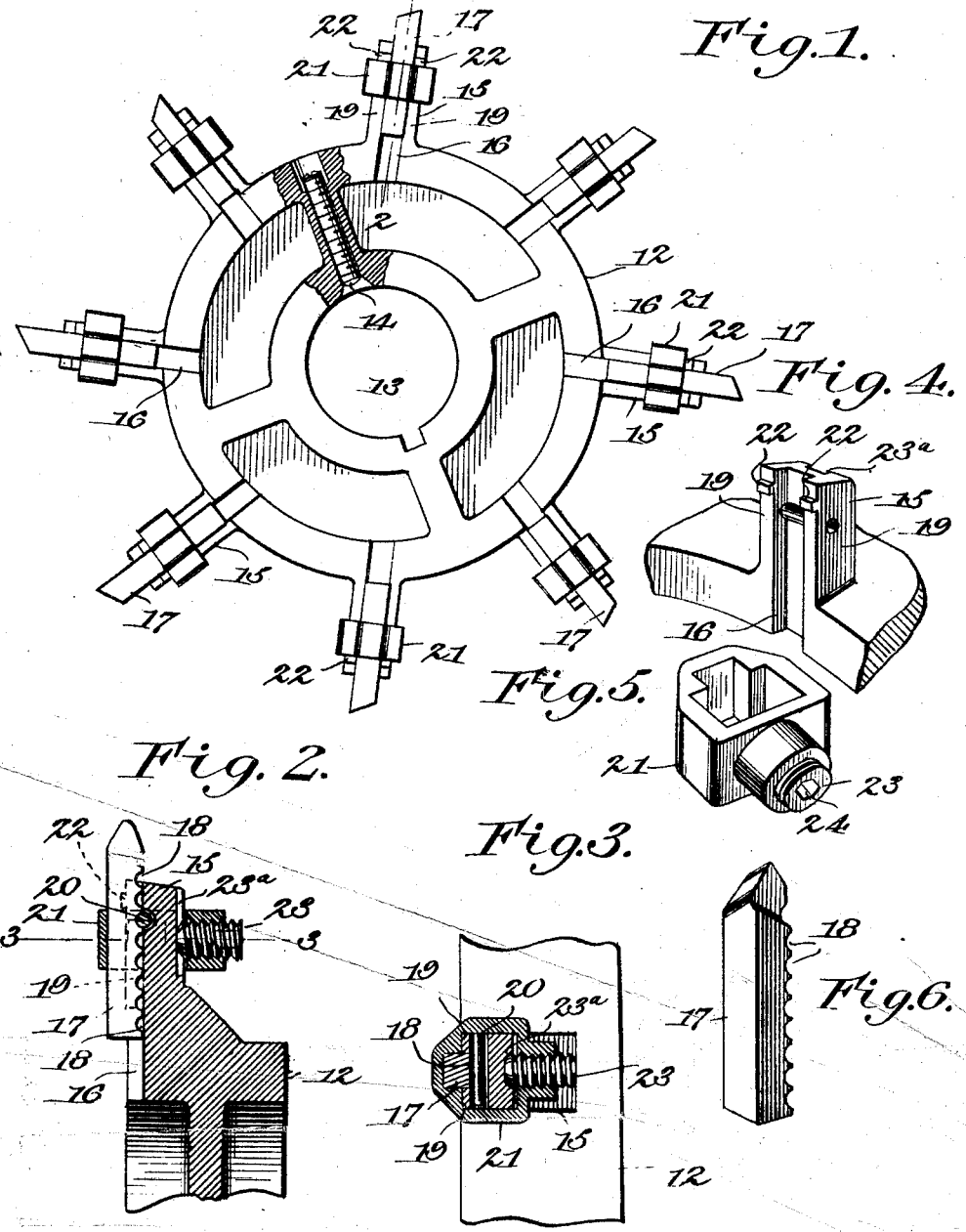

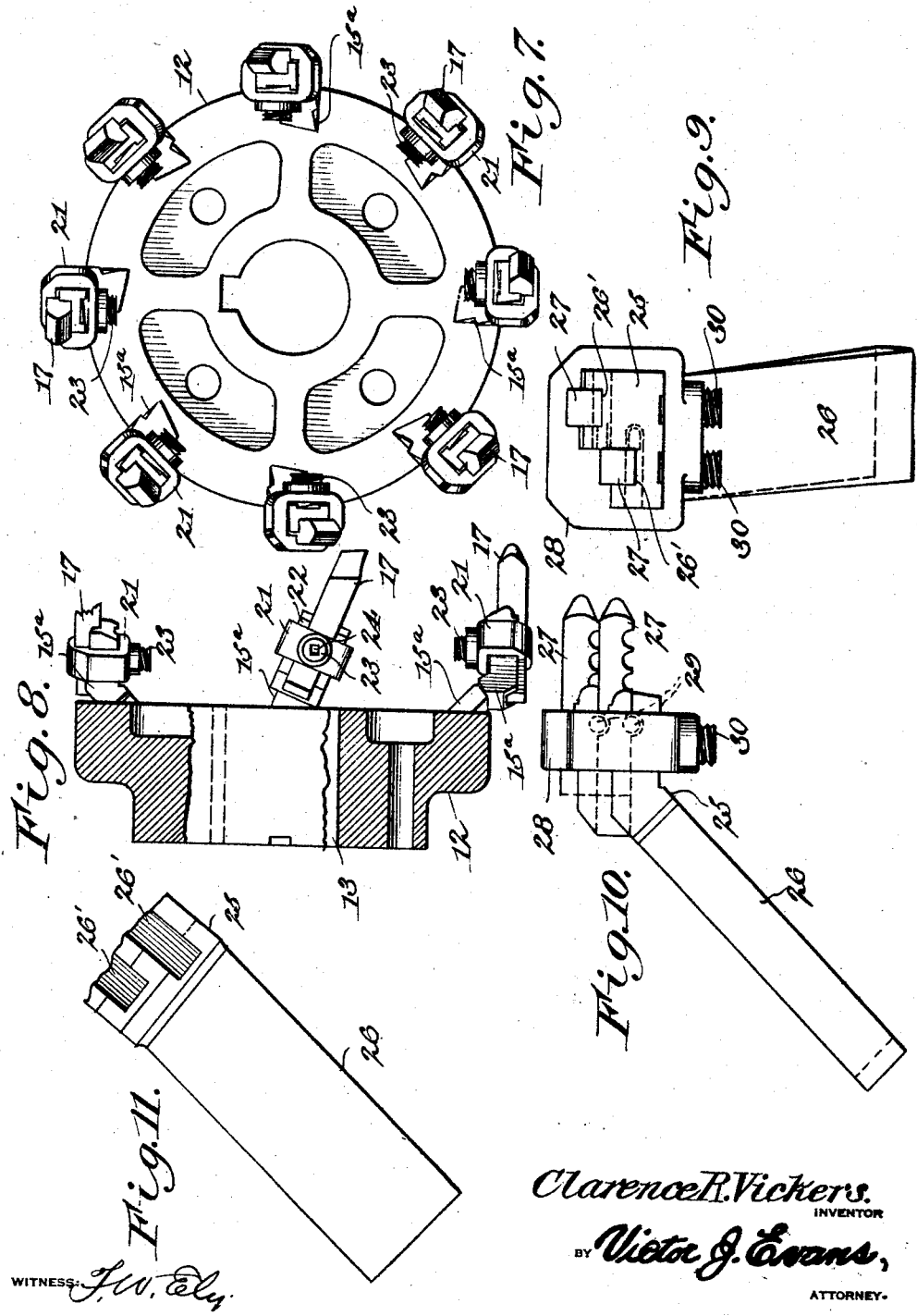

Patented July 21, 1925.

1,547,087

UNITED STATES PATENT OFFICE.

CLARENCE ROEDEL VICKERS, OF LANCASTER, PENNSYLVANIA.

TOOL HOLDER.

Application filed January 19, 1923. Serial No. 613,736.

*To all whom it may concern:*

Be it known that I, CLARENCE R. VICKERS, a citizen of the United States, residing at Lancaster, in the county of Lancaster and State of Pennsylvania, have invented new and useful Improvements in Tool Holders, of which the following is a specification.

This invention relates to tool holders generally.

The invention is particularly designed for use in connection with tool heads wherein the tools supported thereby can be conveniently positioned in proper or accurate relation to the work operated upon.

An essential object of the invention resides in the provision of means for effectively adjusting the cutters with respect to the work to be operated upon without necessitating removal of the tool head from the lathe or machine after the head is applied or mounted in a working position.

A still further object of the invention is to provide a tool holder and tool characterized by co-acting elements wherein means are employed for effecting quick adjustments of the tool and for firmly holding the tool in its position.

Another object of the invention is to provide a tool and tool holder whereby as the tool is worn, it can be adjusted to expose a new cutting surface and thereby permit practically the whole portion of the tool to be used, thus eliminating the expense of new tools and enabling the work to be carried on without material interruption.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a front view of my improved tool holder showing a set of tools mounted thereon.

Figure 2 is a section on line 2—2 of Figure 1.

Figure 3 is a section on line 3—3 of Figure 2.

Figure 4 is a perspective view of a portion of the head showing the tool receiving lug.

Figure 5 is a perspective view of the locking device.

Figure 6 is a perspective view of the cutter.

Figure 7 is a view similar to Figure 1 showing a slightly modified form of the invention.

Figure 8 is a vertical section therethrough with parts in elevation.

Figure 9 is a front view of a still modified form of the invention.

Figure 10 is a side view of the form shown in Figure 9, and

Figure 11 is a plan view of the supporting arm and lug for the cutter.

Except for certain details of construction which I will describe hereinafter, the head 12 which supports the cutters may be of any suitable well-known design. As shown in Figures 1 to 8 inclusive the head is provided with a spindle opening 13 adapted to be connected with the spindle of an operating machine or lathe. The head carries a set screw 14 which is adjustable into the opening 13 to permit the head to be secured or locked upon the spindle. The head 10 is of circular form and as shown the set screw 14 is exposed from the periphery of the head so that it can be readily adjusted as the occasion demands.

Radiating from the head are lugs 15 each of which is provided with a U-shaped channel 16 for the accommodation of a cutter 17. The cutter is of rectangular formation in cross section and it preferably is formed of a short length of steel bar. Along one face the cutter is provided with a longitudinal series of suitably spaced transverse grooves 18. These grooves are preferably arranged immediately side by side with the walls of one groove merging directly into the walls of the adjacent groove. Between the side walls 19—19 of the channel 16 is a fastening key or pin 20, the same being removable whereby to permit it to be interchangeably engaged in any one of the transverse grooves 18. Embracing the lug 15 and tool 17 is a sleeve 21 whose walls snugly embrace the lug 15 and said tool 17 as clearly shown in Figure 3. After the sleeve is adjusted upon the lug 15 and mating cutter 17, it is held against accidentally sliding off of the lug by means of stop teats 22 formed on the lug and adapted to co-act or engage with the sleeve. The sleeve is provided with a set screw 23 engageable in a groove 23ª in one face of the lug 15, whereby the sleeve may be firmly clamped against the lug and the cutter 17 moved bodily with respect to the pin or key 20 so as to lock same positively in an adjusting groove 18 as clearly shown in Figures 2 and 3.

From the construction herein described, it is evident that as the cutters are worn down, they can be re-sharpened and adjusted longitudinally with respect to the supporting lugs 15. In this manner practically the entire shank of each cutter can be utilized. When beginning an operation the cutters, through the aforesaid construction can be conveniently moved into proper relation with respect to the work to be operated upon. Each of the screws 23 is provided with a key socket 24 for the reception of suitable wrench when it is desired to adjust the screw.

As shown in Figure 1 the lugs 15 are staggered relatively around the periphery of the head. The alternate lugs are in alignment with each other. In this manner the cutters 17 are arranged in sets side by side so that a broad cut can be made upon the work during the cutting operation. If it is desired to narrow the size of the cut one set of cutters 17 can be removed. However, and in this respect I do not desire to be limited. The cutters can be arranged in uniform alignment or one directly behind another through the periphery of the cutter head. I am particularly concerned in the manner of adjusting the cutters longitudinally with respect to the lugs 15 so that many adjustments of the cutters can be had to meet varying requirements and to permit almost the entire portion of each cutter to be utilized and thereby effect a material saving in the cost of upkeep of devices of this character.

In Figures 7 and 8 the lugs 15$^a$ which are similar to the lugs 15 extend from the side of the head 12 instead of from the periphery thereof. Each lug is arranged substantially at an obtuse angle with respect to the side of the head 12. The cutters 17 shown in this form of the invention are arranged in the same circle around the head. In other words they are disposed one behind the other so that they follow directly in a common path. Except in respect to the manner of angularly mounting the lugs 15$^a$ upon the side face of the head 12, the invention illustrated in Figures 7 and 8 is the same as the first mentioned embodiment of the invention.

It is further intended that it shall be understood that I do not wish to limit myself to a combination of tool holder with a particular form of supporting head. Any form of support may be used in lieu of a revolving head. Reciprocatory or otherwise suitably actuated means can be employed for controlling movement of the cutters over the work.

In Figures 9 to 11 inclusive I employ a tool engaging lug 25 having an integral shank 26 adapted to be connected in the customary manner to a clamp or the like. The lug is offset with respect to the plane of the shank 26 and same is provided with a plurality of grooves 26'—26' for the reception of the cutters 27—27. These cutters are the same as those elsewhere described herein and they co-act with a clamping sleeve 28 and pins 29—29. In this form the sleeve is provided with a pair of screws 30 which are respectively arranged in horizontal alignment with the mating cutters 27 so that the latter can be uniformly advanced into co-acting relation with the pins 29. Also in this form the cutters 27 are staggered with respect to each other.

The lug 15 herein referred to and with which the sleeve 20 co-acts is equivalent to the tool head shown and described in my co-pending application filed Mar. 9, 1921, Ser. No. 451,077. The sleeve 21 is also equivalent to the collar shown and described in the foreword of this application. This is accordingly true of the corresponding part in the modified form of my invention herein described.

The type of cutters and their associated members as shown in Figures 1 to 8 are of the rotary type commonly known as milling cutters and the lugs thereof are to be constructed at such angles so as to provide a right or left hand cutter, when the blades thereof are inverted in said lugs. The cutter shown in Figure 1 is the type used in connection with a boring machine adapted to bore out cylinders and openings of a like character, while the cutters shown in Figures 9 to 11 are used in the binding post of a planer or sharpener, and the staggered cutter blades are to speed up the time in machining material, as the work to be machined comes in contact with the first cutter blade and as the second blade is set out further or lower when the work travels to receive a second cutter blade, there is a second cut in the operation which requires a very short time after the first blade started to cut and each blade then takes a cut at the same time and travel of the work. A greater advantage is found in uniting the staggered type of cutter as the cut taken thereby can be a very heavy one, in one travel of the work past the cutting tools, but the strain has been reduced to a minimum on the tool or block and the edge on the blade is retained for a longer time, as each blade takes a good size cut without overheating the surface to be cut, or the edge of the cutting blade. I desire to use the lugs as shown in Figures 9 to 11 in the same manner as those shown in Figures 1 to 8 inclusive and attention is respectfully invited to the fact that the sleeve acts to protect the pin or key from becoming displaced, therefore it is not necessary that the pin be snugly fitted in the hole in the lug. The device shown in the Figures 9 to 11 can be used on the lathe for taking a double step cut and can also be used on a boring mill such as a vertical boring mill, and on the common type milling machine in which it takes the place of a box cutter or fly cutter, as well as for planer and sharpener machines.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A tool holder of the character described comprising a lug provided with a groove arranged longitudinally on each side thereof, a cutting tool slidable in one of said grooves, a sleeve slidably mounted on said lug and being adapted for retaining the tool within one of said grooves, a set screw passing through said sleeve and received in the other of said grooves for limiting slidable adjustment of the sleeve, and means co-acting with said grooved lug and sleeve for locking the tool in fixed adjusted position and said co-acting means consisting of a pin engageable with the tool.

2. A tool holder comprising a grooved lug, a cutting tool provided with a plurality of parallel transversely disposed grooves and slidably mounted within the groove, a sleeve slidably mounted on the lug and being adapted to retain the tool within the groove, means for limiting sliding adjustment of the sleeve, and a pin bridging the groove of the lug for locking the tool in fixed adjusted position and being received in one of the grooves of the tool.

In testimony whereof I have affixed my signature.

CLARENCE ROEDEL VICKERS.